United States Patent

Perkins et al.

[11] Patent Number: 5,247,550
[45] Date of Patent: Sep. 21, 1993

[54] CORROSION RESISTANT ZIRCONIUM LINER FOR NUCLEAR FUEL ROD CLADDING

[75] Inventors: Richard A. Perkins, Kennewick; Raymond A. Busch, Benton City, both of Wash.

[73] Assignee: Siemens Power Corporation, Richland, Wash.

[21] Appl. No.: 858,904

[22] Filed: Mar. 27, 1992

[51] Int. Cl.$^5$ ............................................. G21C 3/06
[52] U.S. Cl. ........................................................... 376/416
[58] Field of Search .................... 376/416, 417, 414; 428/548; 420/422

[56] References Cited

U.S. PATENT DOCUMENTS

| | | | |
|---|---|---|---|
| 3,802,939 | 4/1974 | Ohtani et al. | 428/636 |
| 3,969,186 | 7/1976 | Thompson et al. | 376/414 |
| 4,032,400 | 6/1977 | Johnson et al. | 376/417 |
| 4,200,492 | 4/1980 | Armijo et al. | 376/417 |
| 4,390,497 | 6/1983 | Rosenbaum et al. | 376/414 |
| 4,610,842 | 9/1986 | Vannesjo | 376/416 |
| 4,735,768 | 4/1988 | Stehle et al. | 376/417 |
| 4,762,675 | 8/1988 | Feild, Jr. | 376/414 |
| 4,816,215 | 3/1989 | Worcester et al. | 376/416 |
| 4,863,679 | 9/1989 | Imahashi et al. | 376/417 |
| 4,894,203 | 1/1990 | Adamson | 376/416 |
| 5,024,809 | 6/1991 | Taylor | 376/417 |
| 5,026,517 | 6/1991 | Menken et al. | 376/414 |

Primary Examiner—Daniel D. Wasil
Attorney, Agent, or Firm—Ira Lee Zebrak

[57] ABSTRACT

A cladding tube for nuclear fuel having an outer elongated cladding tube and a zirconium liner which lines the outer cladding tube, the inner wall of the liner having an inner diffusion portion of a zirconium based alloy of tin and/or vanadium.

43 Claims, 2 Drawing Sheets

CORROSION RESISTANT ZIRCONIUM LINER FOR NUCLEAR FUEL ROD CLADDING

BACKGROUND OF THE INVENTION

1. Field Of The Invention

The present invention relates to nuclear fuel rods for a nuclear reactor fuel assembly and in particular to a cladding tube made of a zirconium alloy and lined on its inner surface with a zirconium liner.

2. Description Of Prior Art

A nuclear fuel element typically has a cladding tube which houses a stack of fuel pellets of sintered uranium oxide, thorium oxide, plutonium oxide or a mixture of such oxide fuels, and end plugs which seal both the upper and lower ends of the cladding tube. In addition, a gas storage plenum or space is provided within the cladding tube to accommodate fission product gases. Within the plenum, a spring or mechanism is provided for stably holding the sintered fuel pellets within the cladding tube.

The cladding functions in part to prevent contact and to prevent chemical reaction between the fuel pellets and the coolant and/or moderator. In addition, the cladding tube prevents contamination of the coolant by radioactive fission products emitted from the fuel pellets resulting from reactor operation. The loss of leak tightness of the cladding tube could contaminate the reactor and associated systems and interfere with plant operations.

The material for the cladding tube is required to have excellent mechanical properties and high corrosion resistance in the environment and under the operating conditions expected during reactor operations. Common cladding materials include zirconium and its alloys and stainless steel. Zirconium alloys in which the major component is zirconium are widely used as the materials of the cladding tube. Two of the most commonly used zirconium alloys are Zircaloy 2 and Zircaloy 4 and are described in ASTM standard B350-91 (1991), Standard Specification For Zirconium and Zirconium Alloy Ingots For Nuclear Application, compositions R60802 and R60804, respectively. Zircaloy 2 (composition R60802) is composed of from 1.20 to 1.70 weight percent tin, 0.07 to 0.20 weight percent iron, 0.05 to 0.15 weight percent chromium, 0.03 to 0.08 weight percent nickel, where the iron plus chromium plus nickel content is 0.18 to 0.38 weight percent, and the balance is zirconium plus impurities. Zircaloy 4 (composition R60804) is composed of from 1.20 to 1.70 weight percent tin, 0.18 to 0.24 weight percent iron, 0.07 to 0.13 weight percent chromium, where the iron plus chromium content is from 0.28 to 0.37 weight percent, and the balance is zirconium plus impurities. The maximum impurity levels for Zircaloy 2 and Zircaloy 4 are given in the following table which is from Table 1 of the ASTM B350-91 Standard.

| MAXIMUM IMPURITIES, WEIGHT % | | | |
|---|---|---|---|
| | R60001 | R60802 | R60804 |
| Aluminum | 0.0075 | 0.0075 | 0.0075 |
| Boron | 0.00005 | 0.00005 | 0.00005 |
| Cadmium | 0.00005 | 0.00005 | 0.00005 |
| Carbon | 0.027 | 0.027 | 0.027 |
| Chromium | 0.020 | — | — |
| Cobalt | 0.0020 | 0.0020 | 0.0020 |
| Copper | 0.0050 | 0.0050 | 0.0050 |
| Hafnium | 0.010 | 0.010 | 0.010 |
| Iron | 0.150 | — | — |
| Hydrogen | 0.0025 | 0.0025 | 0.0025 |
| Oxygen | * | * | * |
| Magnesium | 0.0020 | 0.0020 | 0.0020 |
| Manganese | 0.0050 | 0.0050 | 0.0050 |
| Molybdenum | 0.0050 | 0.0050 | 0.0050 |
| Nickel | 0.0070 | — | 0.0070 |
| Niobium | 0.010 | 0.010 | 0.010 |
| Nitrogen | 0.0065 | 0.0065 | 0.0065 |
| Silicon | 0.0120 | 0.012 | 0.0120 |
| Tin | 0.0050 | — | — |
| Titanium | 0.0050 | 0.0050 | 0.0050 |
| Tungsten | 0.010 | 0.010 | 0.010 |
| Uranium (total) | 0.00035 | 0.00035 | 0.00035 |

*When so specified in a purchase order, oxygen shall be determined and reported. Maximum or minimum permissible values, or both, shall be as specified in the purchase order.

Although several zirconium alloys such as Zircaloy 2 and Zircaloy 4 have excellent properties as a cladding material under normal conditions, at high degrees of burn up, the cladding tube is subject to brittle fracture due to localized mechanical stresses resulting from differential expansion and friction between the fuel and the cladding combined with the presence of fission product gases released from the fuel but trapped within the cladding. This type of failure mechanism is referred to as Pellet Cladding Interaction (PCI).

In order to prevent PCI cracking, a cladding liner material is positioned between the fuel pellets and the zircaloy tube. This liner eliminates direct contact between the zircaloy and the fission products. In order to relieve the local stresses caused by the thermal expansion of the fuel pellets, the liner material must also have a high ductility. It is well known that a suitable material for the liner is pure zirconium. The maximum impurity levels for nuclear grade zirconium are listed in the preceding table under the heading R60001. Both crystal bar and sponge zirconium have been used for this purpose. Since the zirconium needs to be very ductile, it performs this function best if it is unalloyed. However, unalloyed zirconium has very poor corrosion resistance. If the cladding is breached and water and/or steam enters the interior of the fuel rod, the zirconium liner, and particularly the inner wall of the zirconium liner is subject to rapid oxidation which may cause abnormally large secondary failures. Such failures can lead to large axial splits in the cladding and allow unacceptably large releases of radioactive material into the coolant. However, adding alloying material to the liner to improve the corrosion resistance can also reduce the ductility of the liner.

The ductility and the large grain size of the zirconium liner may promote surface cracking or microfissuring during the fabrication of the cladding. U.S. Pat. No. 4,894,203 provided an improved nuclear fuel rod where a layer of an alloy of zirconium having additions of iron, chromium, copper, nitrogen or niobium which form the alloy is placed on the inner wall of the zirconium liner in order to inhibit the tendency of the zirconium liner to crack during fabrication and oxidize during operation. U.S. Pat. Nos. 4,610,842 and 4,816,215 discuss alloying the entire liner with between 0.1 and 4% tin to improve its corrosion resistance. However, because substitutional alloying by tin increases the strength of zirconium-tin alloys beyond that of pure zirconium, the ductility of liners made of zirconium-tin alloys is decreased.

It would thus be an advantage over the prior art to provide a zirconium liner for cladding of nuclear fuel rods having a corrosion resistant inner alloy surface while maintaining the ductility of the zirconium liner.

SUMMARY OF THE INVENTION

A cladding tube for nuclear fuel is disclosed having an outer elongated metallic cladding tube, and a a zirconium cladding liner having an inner wall, the outer elongated metallic cladding tube being lined internally with the cladding liner, the cladding liner having an inner diffusion portion formed in and extending in from the inner wall, the inner diffusion portion comprising a zirconium based alloy selected from the group of zirconium-tin alloys, zirconium-vanadium alloys, and zirconium-tin-vanadium alloys, the balance being zirconium with the impurities normally occurring in the zirconium cladding liner.

DETAILED DESCRIPTION

Figure 1:
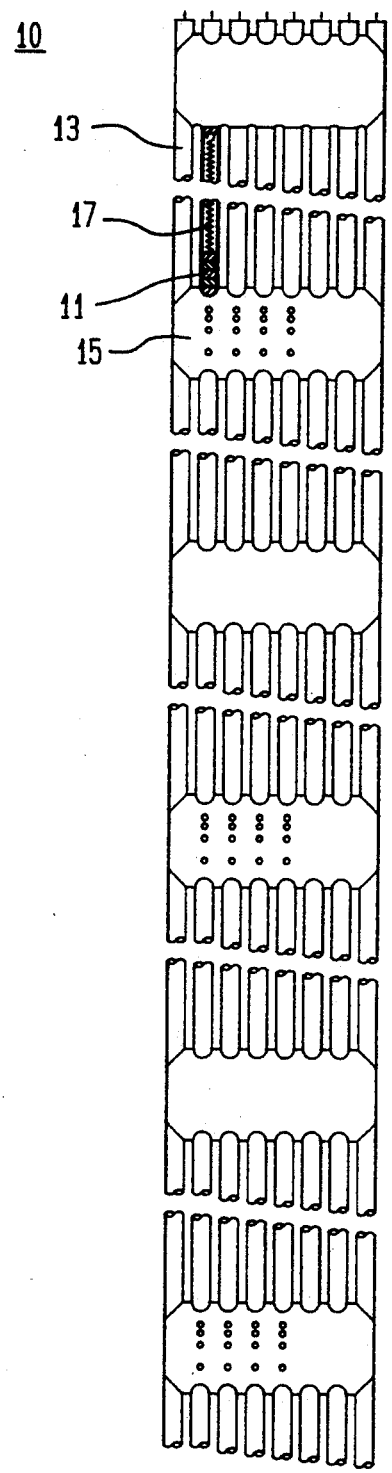
FIG. 1 is an elevation view, partially in section, of a typical fuel assembly for a nuclear power reactor, the assembly being foreshortened in height and partially broken away for convenience and clarity.

Referring to FIG. 1, a typical 8×8 fuel bundle assembly for a boiling water reactor is indicated generally by the reference numeral 10. The fuel assembly 10 includes upper and lower tie plates (not shown), and a plurality of fuel rods 13 of tubular shape which are secured at opposite ends to the upper and lower tie plates. A plurality of grid spacers 15 is disposed along the length of the fuel rods 13. Spacers 15 form cells through which the fuel rods 13 extend. A flow channel (not shown) is disposed around the outer periphery of the bundle of fuel rods 13. For a more detailed description of such a structure, reference may be made to U.S. Pat. No. 4,803,044 which is assigned to the same assignee as the present invention.

Although reference is made in the specification to a 8×8 fuel rod array, such an array has been selected for illustrative purposes only. Although the present invention is described for tubular fuel rods or fuel rods having circular cross-sectional areas, those skilled in the art will readily appreciate that the present invention can be utilized with all fuel rod sizes, shapes and cross-sectional configurations.

Each of the fuel rods 13 encloses a stack of fuel pellets 11. The pellets 11 in each stack are maintained in close proximity to each other by means of a spring 17 disposed between an upper end of the rod 13 and the uppermost one of the pellets 11.

Figure 2:
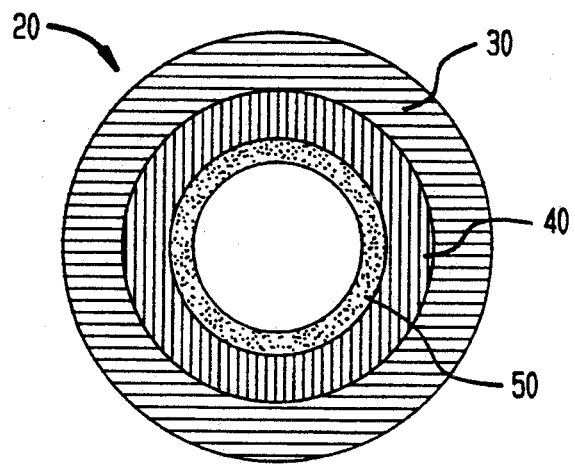
FIG. 2 is a cross-sectional view, drawn to a larger scale than FIG. 1, of the cladding of a nuclear fuel rod cladding tube showing a deposited layer of material on the inner wall of a liner before annealing.

Referring to FIG. 2, fuel rod cladding 20 is comprised of cladding tube 30 and liner 40. On the inner wall of liner 40 is deposited a layer 50 of tin or vanadium. The cladding is then annealed to diffuse the tin and/or vanadium into the liner.

Figure 3:
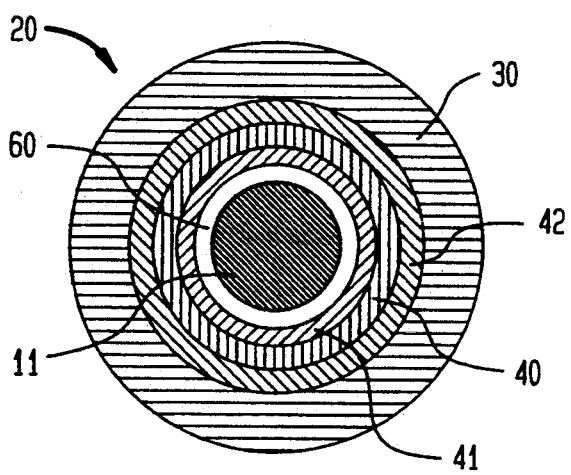
FIG. 3 is a cross-sectional view, drawn to a larger scale than FIG. 1, of a nuclear fuel rod formed after annealing the cladding shown in FIG. 2.

FIG. 3 is a cross-sectional view of one end of the nuclear fuel rods employed in the assembly shown in FIG. 1. The fuel rod 13 shown in FIG. 3 is formed after annealing the cladding tube 30, liner 40 and layer 50 shown in FIG. 2. Liner 40 has an inner diffusion portion 41 which is the diffusion zone created during annealing by the migration of the tin or vanadium into liner 40 from deposited layer 50 of tin or vanadium. After the formation of cladding 20, fuel pellets 11 are inserted into the cladding. Fuel pellets 11 are separated from inner diffusion portion 41 of liner 40 by gap 60.

At the same time that the tin or vanadium diffuses to form the inner diffusion portion 41 of zirconium liner 40, alloying metals from the zircaloy cladding 30 diffuses through the outer wall of and into liner 40. The diffusion of metals such as iron, chromium and/or nickel occurs from zircaloy cladding 30 into liner 40 to form an outer diffusion portion 42 of an alloy of zirconium. In an alternative embodiment, such metals can diffuse through liner 40 and into the inner diffusion portion 41 to form an alloy of zirconium with the tin or vanadium which further contributes to higher corrosion resistance of the inner surface of the liner.

According to the present invention, the composition of liner 40 is altered during fabrication by depositing tin and/or vanadium onto the inner surface of liner 40 during the cladding fabrication process and allowing the deposited material to diffuse into liner 40 during the subsequent annealing. The deposition is done after any reduction step following extrusion. The tin and/or vanadium layer is placed on the inner wall of liner 40 by a variety of known methods including, but not limited to chemical or physical vapor deposition, electrolytic or immersion (electroless) plating, or sputtering.

Tin and vanadium are deposited on the inner wall of liner 40 and subsequently annealed to form an inner diffusion portion 41 which functions to increase the resistance to corrosion of the zirconium in the event of a breach of cladding tube 30. The tin or vanadium diffuses into the zirconium liner 40 to form a thin alloy of zirconium in inner diffusion portion 41 but substitutional alloying of the bulk of the liner does not occur. This allows the portion of the liner without tin or vanadium alloying to retain the necessary ductility to provide protection against PCI cracking. The improved corrosion resistance at the surface of inner diffusion portion 41 causes the formation of a protective oxide scale which prevents the access of the coolant to the underlying zirconium liner which would be rapidly oxidized. By forming an alloy in the inner diffusion portion 41 on the inner portion of liner 40, improved corrosion resistance is obtained in the event that water or steam enters the interior of the rod as well as maintaining the ductility of liner 40 to resist the mechanical loads imparted to it by fuel pellets 11.

Although materials used for cladding 30 include zirconium and its alloys and stainless steel, the preferred material is zirconium and its alloys, and more particularly Zircaloy 2 and Zircaloy 4. The preferred material for liner 40 is high purity zirconium such as sponge source or crystal bar source zirconium.

Cladding 20 of the present invention is formed by a process for converting ingots or tube hollows to thin-walled elongated tubes. An ingot or rod of material, preferably zircaloy, for cladding tube 30 is formed into a tube hollow and lining 40, preferably zirconium, is inserted into the hollow and attached to the inside surface of tube 30. The compound cladding billet is thereafter extruded and is later subjected to a sequence of rolling or pilgering steps. Diffusion bonding between tube 30 and liner 40 is accomplished during the high temperature extrusion process and subsequent pilgering and annealing of the cladding during fabrication The tin or vanadium deposition may be performed after any of the reduction steps during the fabrication process. Annealing occurs at a temperature between 500° and 750° C. to form layer 41 containing the tin or vanadium alloy of zirconium on the inside surface of the zirconium liner 40. Preferred annealing conditions range from 650° C. for four hours to 750° C. for one hour. The annealing conditions can be adjusted to allow the desired amount of tin or vanadium diffusion into the liner. The time and temperature used for the subsequent anneals can be altered to provide the desired distribution of the deposited elements in the liner.

Although the use of tin or vanadium to form inner diffusion portion 41 of liner 40 provides increased strength to the liner, the thickness of inner diffusion portion 41 is limited in order that the underlying soft zirconium liner 40 retains its ductility which enables it to prevent the initiation of cracks in the liner as well as blunt crack propagation. In a preferred embodiment of the present invention, the thickness of inner diffusion portion 41 is about 0.1 to about 1.0 $\mu$m.

As the amount of tin or vanadium in the inner diffusion portion 41 increases or as the thickness of inner diffusion portion 41 increases, the ability of the liner to prevent crack propagation is degraded. Thus, it is desirable that the inner diffusion portion 41 be less than ¼ the thickness of liner 40 and preferably less than 1/10 of the liner thickness. The tin content and the vanadium content in the alloyed layer should total less than 1.0% by weight and preferably less than 0.2% by weight in order to retain the ductility of the liner. While the present invention has been particularly shown and described with reference to preferred embodiments thereof, it will be understood by those skilled in the art that various changes in form and details may be made therein without departing from the spirit and scope of the invention.

I claim:

1. A nuclear reactor fuel rod cladding tube for nuclear fuel, comprising:
   an outer elongated metallic cladding tube;
   a zirconium cladding liner having an inner wall, the outer elongated metallic cladding tube being lined internally with the cladding liner, the cladding liner having an inner diffusion portion formed in and extending in from the inner wall, the inner diffusion portion comprising a zirconium based alloy selected from the group of zirconium-tin alloys, zirconium-vanadium alloys, and zirconium-tin-vanadium alloys, the balance being zirconium with the impurities normally occurring in the zirconium cladding liner.

2. The nuclear reactor fuel rod cladding tube as in claim 1 wherein the zirconium based alloy in the inner diffusion portion is formed by depositing a layer of material on the inner wall of the zirconium cladding liner and annealing the cladding tube and cladding liner having the layer of material at a temperature from about 500° C. to about 750° C. to diffuse the material through the inner wall of the liner to form the inner diffusion portion, the material being selected from the group of elemental tin and elemental vanadium.

3. The nuclear reactor fuel rod cladding tube as in claim 2 wherein the content of tin and vanadium in the inner diffusion portion is less than about one weight percent.

4. The nuclear reactor fuel rod cladding tube as in claim 3 wherein the content of tin and vanadium in the inner diffusion portion is less than about 0.2 weight percent.

5. The nuclear reactor fuel rod cladding tube as in claim 3 wherein the inner diffusion portion from about 0.1 $\mu$m to about 1.0 $\mu$m.

6. The nuclear reactor fuel rod cladding tube as in claim 4 wherein the inner diffusion portion has a thickness from about 0.1 $\mu$m to about 1.0 $\mu$m.

7. The nuclear reactor fuel rod cladding tube as in claim 5 wherein the material for the zirconium cladding liner is selected from the group consisting of crystal bar zirconium and sponge zirconium.

8. The nuclear reactor fuel rod cladding tube as in claim 7 wherein the material of the outer elongated metallic cladding tube is an alloy of zirconium.

9. The nuclear reactor fuel rod cladding tube as in claim 8 wherein the cladding liner has a thickness and the inner diffusion portion has a thickness which is less than about one quarter the thickness of the liner.

10. The nuclear reactor fuel rod cladding tube as in claim 9 wherein the thickness of the inner diffusion portion is less than about one tenth the thickness of the liner.

11. The nuclear reactor fuel rod cladding tube as in claim 10 wherein the alloy of zirconium is zircaloy 2.

12. The nuclear reactor fuel rod cladding tube as in claim 10 wherein the alloy of zirconium is zircaloy 4.

13. The nuclear reactor fuel rod cladding tube as in claim 11 wherein the cladding liner has an outer wall, and the liner further has an outer diffusion portion formed in and extending in from the outer wall, the outer diffusion portion comprising a zirconium based alloy formed by the diffusion of metals from the outer cladding tube, the metals being selected from the group consisting essentially of nickel, iron and chromium.

14. The nuclear reactor fuel rod cladding tube as in claim 12 wherein the cladding liner has an outer wall, and the liner further has an outer diffusion portion formed in and extending in from the outer wall, the outer diffusion portion comprising a zirconium based alloy formed by the diffusion of metals from the outer cladding tube, the metals being selected from the group consist essentially of iron and chromium.

15. The nuclear reactor fuel rod cladding tube as in claim 14 wherein annealing occurs at a temperature from about 650° C. for a duration of about four hours to about 750° C. for a duration of about one hour.

16. A nuclear fuel element comprising:
   a cladding tube comprising:
      an outer elongated metallic cladding tube;
      a zirconium cladding liner having an inner wall, the outer elongated metallic cladding tube being lined internally with the cladding liner, the cladding liner having an inner diffusion portion formed in and extending into the inner wall, the inner diffusion portion comprising a zirconium based alloy selected from the group of zirconium-tin alloys, zirconium vanadium alloys and zirconium-tin-vanadium alloys, the balance being zirconium with the impurities normally occurring in the zirconium cladding liner;
   a plurality of fuel pellets arranged within the cladding tube so as to leave an annular gap between the inner wall of the zirconium cladding liner;
   sealing means for sealing the ends of the cladding tube; and holding means for holding the fuel pellets within the cladding tube.

17. The nuclear fuel element as in claim 16 wherein the zirconium based alloy in the inner diffusion portion is formed by depositing a layer of material on the inner wall of the zirconium cladding liner and annealing the cladding tube and cladding liner having the layer of material at a temperature from about 500° C. to about 750° C. to diffuse the material through the inner wall of the liner to form the inner diffusion portion, the material being selected from the group of elemental tin and elemental vanadium.

18. The nuclear fuel element as in claim 17 wherein the content of tin and vanadium in inner diffusion portion is less than about one weight percent.

19. The nuclear fuel element as in claim 18 wherein the content of tin and vanadium in inner diffusion portion is less than about 0.2 weight percent.

20. The nuclear fuel element as in claim 18 wherein the inner diffusion portion has a thickness from about 0.1 μm to about 1.0 μm.

21. The nuclear fuel element as in claim 19 wherein the inner diffusion portion has a thickness from about 0.1 μm to about 1.0 μm.

22. The nuclear fuel element as in claim 20 wherein the material for the zirconium cladding liner is selected from the group consisting of crystal bar zirconium and sponge zirconium.

23. The nuclear fuel element as in claim 22 wherein the material of the outer elongated metallic cladding tube is an alloy of zirconium.

24. The nuclear fuel element as in claim 23 wherein the cladding liner has a thickness and the inner diffusion portion has a thickness which is less than about one quarter the thickness of the liner.

25. The nuclear fuel element as in claim 24 wherein the thickness of the inner diffusion portion is less than about one tenth the thickness of the liner.

26. The nuclear fuel element as in claim 25 wherein the alloy of zirconium is zircaloy 2.

27. The nuclear fuel element as in claim 25 wherein the alloy of zirconium is zircaloy 4.

28. The nuclear fuel element as in claim 26 wherein the cladding liner has an outer wall, and the liner further has an outer diffusion portion formed in and extending in from the outer wall, the outer diffusion portion comprising a zirconium based alloy formed by the diffusion of metals from the outer elongated metallic cladding tube, the metals being selected from the group consisting essentially of nickel, iron and chromium.

29. The nuclear fuel element as in claim 27 wherein the cladding liner has an outer wall, and the liner further has an outer diffusion portion formed in and extending in from the outer wall, the outer diffusion portion comprising a zirconium based alloy formed by the diffusion of metals from the outer elongated metallic cladding tube, the metals being selected from the group consisting essentially of iron and chromium.

30. The nuclear fuel element as in claim 28 wherein annealing occurs at a temperature from about 650° C. for a duration of about four hours to about 750° C. for a duration of about one hour.

31. The nuclear fuel element as in claim 29 wherein annealing occurs at a temperature from about 650° C. for a duration of about four hours to about 750° C. for a duration of about one hour.

32. The nuclear reactor fuel rod cladding tube as in claim 1 wherein the cladding liner has an outer wall, and the liner further has an outer diffusion portion formed in and extending in from the outer wall, the outer diffusion portion comprising a zirconium based alloy formed by the diffusion of metals from the outer cladding tube, the metals being selected from the group consisting essentially of nickel, iron and chromium.

33. The nuclear reactor fuel rod cladding tube as in claim 1 wherein the cladding liner has an outer wall, and the liner further has an outer diffusion portion formed in and extending in from the outer wall, the outer diffusion portion comprising a zirconium based alloy formed by the diffusion of metals from the outer cladding tube, the metals being selected from the group consisting essentially of iron and chromium.

34. The nuclear reactor fuel rod cladding tube as in claim 2 wherein the cladding liner has an outer wall, and the liner further has an outer diffusion portion formed in and extending in from the outer wall, the outer diffusion portion comprising a zirconium based alloy formed by the diffusion of metals from the outer cladding tube, the metals being selected from the group consisting essentially of nickel, iron and chromium.

35. The nuclear reactor fuel rod cladding tube as in claim 34 wherein annealing occurs at a temperature from about 650° C. for a duration of about four hours to about 750° C. for a duration of about one hour.

36. The nuclear reactor fuel rod cladding tube as in claim 2 wherein the cladding liner has an outer wall, and the liner further has an outer diffusion portion formed in and extending in from the outer wall, the outer diffusion portion comprising a zirconium based alloy formed by the diffusion of metals from the outer cladding tube, the metals being selected from the group consisting essentially of iron and chromium.

37. The nuclear fuel element as in claim 16 wherein the cladding liner has an outer wall, and the liner further has an outer diffusion portion formed in and extending in from the outer wall, the outer diffusion portion comprising a zirconium based alloy formed by the diffusion of metals from the outer elongated metallic cladding tube, the metals being selected from the group consisting essentially of nickel, iron and chromium.

38. The nuclear fuel element as in claim 16 wherein the cladding liner has an outer wall, and the liner further has an outer diffusion portion formed in and extending in from the outer wall, the outer diffusion portion comprising a zirconium based alloy formed by the diffusion of metals from the outer elongated metallic cladding tube, the metals being selected from the group consisting essentially of iron and chromium.

39. The nuclear fuel element as in claim 17 wherein the cladding liner has an outer wall, and the liner further has an outer diffusion portion formed in and extending in from the outer wall, the outer diffusion portion comprising a zirconium based alloy formed by the diffusion of metals from the outer elongated metallic cladding tube, the metals being selected from the group consisting essentially of nickel, iron and chromium.

40. The nuclear fuel element as in claim 39 wherein annealing occurs at a temperature from about 650° C. for a duration of about four hours to about 750° C. for a duration of about one hour.

41. The nuclear fuel element as in claim 17 wherein the cladding liner has an outer wall, and the liner further has an outer diffusion portion formed in and extending in from the outer wall, the outer diffusion portion comprising a zirconium based alloy formed by the diffusion of metals from the outer elongated metallic cladding tube, the metals being selected from the group consisting essentially of iron and chromium.

42. The nuclear fuel element as in claim 41 wherein annealing occurs at a temperature from about 650° C. for a duration of about four hours to about 750° C. for a duration of about one hour.

43. The nuclear reactor fuel rod cladding tube as in claim 13 wherein annealing occurs at a temperature from about 650° C. for a duration of about four hours to about 750° C. for a duration of about one hour.

* * * * *